UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN, GERMANY, A CORPORATION OF BADEN.

DYE OF THE ANTHRACENE SERIES AND PROCESS OF MAKING SAME.

SPECIFICATION forming part of Letters Patent No. 688,645, dated December 10, 1901.

Application filed August 13, 1901. Serial No. 71,958. (No specimens.)

*To all whom it may concern:*

Be it known that I, MAX HENRY ISLER, chemist, a citizen of the Swiss Republic, residing at Mannheim, in the Grand Duchy of Baden, in the Empire of Germany, have invented new and useful Improvements in Coloring-Matters of the Anthracene Series and Processes of Producing the Same, of which the following is a specification.

It is known that halogen-substituted amido-anthraquinones and their derivatives are capable of being condensed with primary aromatic amins to form substances which in a sulfonated state are valuable coloring-matters. The condensation is in general brought about by heating with an aromatic amin for a sufficient length of time the halogenized anthraquinone substance chosen with or without a solvent or diluent, as the circumstances may require. If the melt thus obtained (for example, when para-toluidin is employed) be worked up by treating it directly with dilute hydrochloric acid, an impure coloring-matter, as a rule, separates out, which is either worthless or must be further purified. It is therefore preferable to treat the melt (in which, for example, para-toluidin is the amin used) with alcohol and to collect the undissolved coloring-matter by filtration, as then a large amount of the impurities remains dissolved in the alcohol. I have discovered that by carrying on the condensation with the addition of a substance acting as a weak alkali coloring-matters can be obtained which in the form of their sulfo-acids dye wool shades different from and more brilliant and clearer than those of the sulfonated coloring-matters produced by the condensation of halogen-amido-anthraquinone substances and aromatic amins without the aid of a substance acting as a weak alkali.

I have found sodium carbonate and sodium acetate (more especially the latter) suitable substances for use for the purposes of my invention; but other compounds can also be used, and the addition of these substances to the melt, which at times delays the commencement of the reaction, appears to exercise a protective and favorable influence on the progress of the reaction. This influence is more or less marked, according to the halogen-substituted mono- or di- amido-anthraquinone substance employed, and is very striking in the condensation of aromatic amins with halogen-mono-amido-2-methyl-anthraquinone and halogen-diamido-2-methyl-anthraquinone, (see application for Letters Patent, Serial No. 40,443, dated December 19, 1900,) halogen-mono-amido-anthraquinone, (see the specifications of Patents Nos. 654,294 and 654,295,) and halogen-diamido-anthraquinones. (See the specifications of Letters Patents Nos. 631,607 and 631,608.)

In this application I wish to claim the new coloring-matter from mono-amido-2-methyl-anthraquinone bromid and an aromatic amin, such as can be obtained in accordance with Example 1, as hereinafter explained, and my improved process of producing the above-mentioned coloring-matters in general with the aid of a substance acting as a weak alkali.

My new coloring-matter in the form of its sulfo-acid dissolves in water, yielding a violet-blue solution. Thin layers of its solution in concentrated sulfuric acid (containing about ninety-six per cent. of $H_2SO_4$) appear blue-violet. Its solution in warm concentrated sulfuric acid to which boric acid has been added is blue with a red fluorescence. Its solution in anilin is blue and it dyes unmordanted wool pure blue shades.

The following examples will serve to further illustrate the nature of my invention and the manner in which the same may be carried into practical effect; but the invention is not confined to these examples. The parts are by weight.

Example 1: Boil in a reflux apparatus for about three (3) hours ten (10) parts of mono-amido-2-methyl-anthraquinone bromid, (see the application for Letters Patent, Serial No. 40,443, dated December 19, 1900,) one hundred (100) parts of para-toluidin, and ten (10) parts of anhydrous sodium acetate. The melt assumes a magnificent violet-blue color. Pour it into an excess of dilute hydrochloric acid, collect the coloring-matter, which separates out by filtration, wash and dry it. In its sulfonated form it dyes unmordanted wool brilliant blue shades, while the coloring-matter obtained in a similar manner but without the use of acetate dyes dull grayish shades.

By employing sodium carbonate in place of sodium acetate the resulting dyestuff is more brilliant than that obtained without the use of either; but the improvement in this respect is not so great as that occasioned by acetate. When using sodium carbonate, the ingredients should not be boiled for more than about one and a half (1½) hours or until a test portion shows that the maximum yield of coloring-matter has been obtained. In the same way other acetates—for example, lead acetate—exercise a favorable influence on the reaction.

Instead of the mono-amido-2-methyl-anthraquinone-bromid, chlor-amido-2-methyl-anthraquinone can be employed in the above example with similar results. It can be obtained, for instance, by treating one molecular proportion of monoamido-2-methyl-anthraquinone with two atomic proportions of chlorin in a chloroform solution or suspension.

Example 2: Boil in a reflux apparatus for from two (2) to three (3) hours ten (10) parts of brominated mono-amido-anthraquinone, (obtainable as set forth in the specification of Letters Patent Serial No. 654,294,) one hundred (100) parts of para-toluidin, and ten (10) parts of anhydrous sodium acetate, and work up the melt as described in the foregoing example. In the sulfonated form the coloring-matter thus obtained dyes wool shades which are greener than those obtained from the coloring-matter prepared according to Example 1. If the acetate be omitted, the resulting coloring-matter is also in this case of little value, dyeing wool greyish shades.

The procedure is the same when employing other halogen-amido-anthraquinones. For example, the brominated mono-amido-anthraquinone of the above example can be replaced by the same quantity of one of the halogen-diamido-anthraquinones of the specifications of Letters Patents Nos. 631,607 and 631,608 or of one of the halogen-diamido-2-methyl-anthraquinones of the specification of the application for Letters Patent, Serial No. 40,443, dated December 19, 1900. The sulfonation of these substances can be effected in the known manner.

Now what I claim is—

1. The process of producing coloring-matters of the anthracene series by condensing the hereinbefore-defined halogen-substituted anthraquinone substances with aromatic amins in the presence of a substance acting as a weak alkali, substantially as described.

2. The process of producing coloring-matters of the anthracene series by condensing the hereinbefore-defined halogen-substituted anthraquinone substance with aromatic amins in the presence of sodium acetate, substantially as described.

3. The new coloring-matter of the anthracene series such as can be obtained by condensing mono-amido-2-methyl-anthraquinone-bromid with a primary aromatic amin in the presence of sodium acetate, which in the sulfonated form dissolves in water yielding a violet-blue solution, thin layers of whose solution in concentrated sulfuric acid appear blue-violet, whose solution in warm concentrated sulfuric acid to which boric acid has been added is blue with a red fluorescence, whose solution in anilin is blue and which dyes unmordanted wool blue shades, substantially as described.

4. The new coloring-matter of the anthracene series such as can be obtained by condensing mono-amido-2-methyl-anthraquinone-bromid with para-toluidin in the presence of sodium acetate, which in the sulfonated form dissolves in water yielding a violet-blue solution, thin layers of whose solution in concentrated sulfuric acid appear blue-violet, whose solution in warm concentrated sulfuric acid to which boric acid has been added is blue with a red fluorescence, whose solution in anilin is blue and which dyes unmordanted wool blue shades, substantially as described.

In testimony whereof I have hereunto set my hand in the presence of two subscribing witnesses.

MAX HENRY ISLER.

Witnesses:
 JOHN L. HEINKE,
 JACOB ADRIAN.